United States Patent
Tang et al.

(10) Patent No.: US 9,641,060 B2
(45) Date of Patent: May 2, 2017

(54) SWITCHING MODE POWER SUPPLY (71) Applicant: Huawei Technologies Co., Ltd., Shenzhen (CN)

(72) Inventors: Mi Tang, Shenzhen (CN); Qiang Xie, Shenzhen (CN); Long Fan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/717,775

(22) Filed: May 20, 2015

(65) Prior Publication Data
US 2015/0340942 A1 Nov. 26, 2015

(30) Foreign Application Priority Data
May 20, 2014 (CN) .......................... 2014 1 0213339

(51) Int. Cl.
*H02M 3/156* (2006.01)
*H02M 1/00* (2006.01)

(52) U.S. Cl.
CPC ............ *H02M 1/00* (2013.01); *H02M 3/156* (2013.01); *H02M 2001/0009* (2013.01); *H02M 2001/0025* (2013.01)

(58) Field of Classification Search
CPC ................. H02M 3/156; H02M 3/158; H02M 2001/0025; H02M 2001/0009
See application file for complete search history.

(56) References Cited

U.S. PATENT DOCUMENTS

| 6,040,686 A * | 3/2000 | Schenkel .............. H02M 3/156 323/282 |
| 7,215,108 B2 * | 5/2007 | Inn .......................... H02M 1/36 323/285 |

(Continued)

FOREIGN PATENT DOCUMENTS

| CN | 101676830 A | 3/2010 |
| CN | 102076138 A | 5/2011 |

(Continued)

OTHER PUBLICATIONS

Trescases, O., et al., "Sensorless Digital Peak Current Controller for Low-Power DC-DC SMPS Based on a Bi-Directional Delay Line," Power Electronics Specialist Conference, 2007, pp. 1670-1676.
Foreign Communication From a Counterpart Application, European Application No. 15157653.5, Extended European Search Report dated Oct. 14, 2015, 8 pages.

(Continued)

Primary Examiner — Matthew Nguyen
(74) Attorney, Agent, or Firm — Conley Rose, P.C.

(57) ABSTRACT

A switching mode power supply, including a drive circuit, a low-pass filter, a feedback circuit, an operational amplifier, a reference voltage signal generation circuit, a comparator, a pulse width modulation (PWM) signal generation circuit, and a duty cycle detection circuit, where the duty cycle detection circuit is configured to convert a PWM signal that is output by the PWM signal generation circuit or a pulse output voltage signal that is output by the drive circuit into a triangular wave signal, and input the triangular wave signal to a negative input end of the comparator. The present invention is used to avoid using a complex collection circuit to collect a signal from an inductor, thereby reducing complexity of the switching mode power supply, decreasing a current collection time, and improving an operating frequency.

8 Claims, 4 Drawing Sheets (56) References Cited

U.S. PATENT DOCUMENTS

| | | | |
|---|---|---|---|
| 2009/0001952 A1* | 1/2009 | Chang | H02M 3/156 323/280 |
| 2010/0066330 A1 | 3/2010 | Yamamoto et al. | |
| 2012/0306465 A1 | 12/2012 | Suga et al. | |
| 2013/0278233 A1* | 10/2013 | Lee | G05F 1/575 323/280 |
| 2013/0293211 A1* | 11/2013 | Chen | H02M 3/1588 323/282 |

FOREIGN PATENT DOCUMENTS

| | | | |
|---|---|---|---|
| CN | 102364848 | A | 2/2012 |
| CN | 202171757 | U | 3/2012 |
| CN | 202495877 | U | 10/2012 |
| CN | 102946200 | A | 2/2013 |
| CN | 103078500 | A | 5/2013 |
| JP | 2005312245 | A | 11/2005 |
| JP | 20080236816 | A | 10/2008 |

OTHER PUBLICATIONS

Partial English Translation and Abstract of Chinese Patent Application No. CN102946200, Dec. 19, 2015, 8 pages.

Partial English Translation and Abstract of Chinese Patent Application No. CN202495877, Dec. 19, 2015, 11 pages.

Foreign Communication From a Counterpart Application, Chinese Application No. 201410213339.X, Chinese Office Action dated Nov. 25, 2015, 6 pages.

Foreign Communication From a Counterpart Application, Chinese Application No. 201410213339.X, Chinese Search Report dated Nov. 16, 2015, 2 pages.

Foreign Communication From a Counterpart Application, Chinese Application No. 201410213339.X, Chinese Search Report dated Dec. 27, 2016, 2 pages.

Foreign Communication From a Counterpart Application, Chinese Application No. 201410213339.X, Chinese Notice of Allowance dated Jan. 12, 2017, 2 pages.

* cited by examiner

Acquire a PWM signal generated in a control loop of a switching mode power supply or a pulse output voltage signal generated according to PWM signal control in a main circuit — S101

Convert the PWM signal or the pulse output voltage signal into a triangular wave signal, and input the triangular wave signal to a negative input end of a comparator disposed in the control loop — S102

SWITCHING MODE POWER SUPPLY

CROSS-REFERENCE TO RELATED APPLICATIONS

This application claims priority to Chinese Patent Application No. 201410213339.X, filed on May 20, 2014, which is hereby incorporated by reference in its entirety.

TECHNICAL FIELD

The present invention relates to the field of electronic technologies, and in particular, to a switching mode power supply.

BACKGROUND

Due to advantages such as a small volume, a light weight, and high efficiency, a switching mode power supply has been applied more widely. Existing switching power supplies are classified into a voltage-mode switching mode power supply and a current-mode switching mode power supply, where a basic operating principle of the voltage-mode switching mode power supply is pulse width modulation (PWM) processing and filtering processing is performed on a direct current (DC) voltage signal that is input, error amplification is performed on the DC voltage signal for which filtering processing has been performed and the DC voltage signal is sent to a comparator; the comparator compares the error-amplified signal with a current signal obtained by sampling (also referred to as sample selection) from an inductor of a low-pass filter, a PWM signal with a certain duty cycle is generated according to a level signal generated after the comparison, and the PWM signal is used to drive a switch element such as a thyristor, so as to obtain a stable output voltage signal.

In existing power supply applications, due to factors of product space, costs, and miniaturization of external components, a higher switching frequency of a switching mode power supply is required; however, in a present switching mode power supply in a current mode, a comparator in a control loop needs to collect a current from an inductor using a sampling circuit, and a present sampling circuit has a delay constraint and cannot operate accurately at a relatively high frequency.

SUMMARY

To resolve the technical problem, embodiments of the present invention provide a switching mode power supply and a loop control method, which can operate stably at a relatively high frequency.

To resolve the foregoing technical problem, an embodiment of the present invention provides a switching mode power supply, including a drive circuit, a low-pass filter, a feedback circuit, an operational amplifier, a reference voltage signal generation circuit, a comparator, a PWM signal generation circuit, and a duty cycle detection circuit, where the drive circuit is configured to convert a DC input voltage signal from an input end of the switching mode power supply into a pulse output voltage signal according to a PWM signal that is input by a switch end; the low-pass filter is configured to perform filtering on the pulse output voltage signal that is output by the drive circuit to obtain a DC output voltage signal, where the DC output voltage signal is output at an output end of the switching mode power supply; the feedback circuit is configured to perform sampling on the DC output voltage signal to obtain a sampled voltage signal, and input the sampled voltage signal to a negative input end of the operational amplifier; the reference voltage signal generation circuit is configured to generate a reference voltage signal, and input the reference voltage signal to a positive input end of the operational amplifier; an output end of the operational amplifier is connected to a positive input end of the comparator, and the operational amplifier is configured to amplify an error between the reference voltage signal and the sampled voltage signal and output an amplification result; the duty cycle detection circuit is configured to convert the PWM signal or the pulse output voltage signal into a triangular wave signal, and input the triangular wave signal to a negative input end of the comparator; the comparator is configured to compare the amplification result with the triangular wave signal to obtain a level signal; and the PWM signal generation circuit is configured to generate the PWM signal according to the level signal that is output by the comparator, and input the PWM signal to the switch end of the drive circuit.

With reference to a first aspect, in a first possible implementation manner, the low-pass filter is a passive low-pass filter.

With reference to the first aspect or the first possible implementation manner, in a second possible implementation manner, the low-pass filter includes an inductor, a diode, and a first capacitor, where one end of the inductor is connected to an output end of the drive circuit and a cathode of the diode, an anode of the diode is connected through the first capacitor to the other end of the inductor, the anode of the diode is also grounded, and the other end of the inductor is coupled to the output end of the switching mode power supply.

With reference to any one of the first aspect to the second possible implementation manner of the first aspect, in a third possible implementation manner, the feedback circuit includes a first resistor and a second resistor, where one end of the first resistor is connected to the other end of the inductor, the other end of the first resistor is grounded using the second resistor, and the other end of the first resistor is connected to the negative input end of the operational amplifier.

With reference to any one of the first aspect to the fourth possible implementation manner of the first aspect, the duty cycle detection circuit is an integrator circuit.

With reference to the fourth possible implementation manner of the first aspect, in a fifth possible implementation manner, the duty cycle detection circuit includes a third resistor and a second capacitor, where one end of the third resistor is connected to an output end of the PWM signal generation circuit or the output end of the drive circuit, and the other end of the third resistor is connected to the negative input end of the comparator; and one end of the second capacitor is connected to the negative input end of the comparator, and the other end of the second capacitor is grounded.

With reference to any one of the first aspect to the fifth possible implementation manner of the first aspect, in a sixth possible implementation manner, the switching mode power supply further includes a compensation circuit, where the compensation circuit is coupled to the operational amplifier, and is configured to adjust a gain margin and a phase margin of the switching mode power supply, so that the switching mode power supply remains stable.

With reference to the sixth possible implementation manner of the first aspect, in a seventh possible implementation manner, the compensation circuit includes a third capacitor, a fourth capacitor, a fourth resistor, and a fifth resistor, where the fifth resistor is located between an output end of the feedback circuit and the negative input end of the operational amplifier; and the fourth resistor and the fourth capacitor connected in series to the fourth resistor are cross-connected between the negative input end of the operational amplifier and the output end of the operational amplifier, and the third capacitor is cross-connected between the negative input end of the operational amplifier and the output end of the operational amplifier.

With reference to any one of the first aspect to the seventh possible implementation manner of the first aspect, in an eighth possible implementation manner, the PWM generation circuit includes a reset-set (RS) flip-flop and a clock generation circuit, a reset end of the RS flip-flop is connected to an output end of the clock generation circuit, a set end of the RS flip-flop is connected to an output end of the comparator, and an output end of the RS flip-flop is connected to the switch end of the drive circuit.

With reference to any one of the first aspect to the eighth possible implementation manner of the first aspect, in a ninth possible implementation manner, the switching mode power supply is formed on a substrate using a manufacturing process of an integrated circuit.

The following beneficial effects are brought by implementing the embodiments of the present invention.

A duty cycle detection circuit acquires a PWM signal that is output by a PWM signal generation circuit in a control loop or a pulse output voltage signal generated by a drive circuit in a main circuit according to a PWM signal, converts the acquired PWM signal or pulse output current signal into a triangular wave signal, and inputs the triangular wave signal to a negative input end of a comparator. This avoids using a complex collection circuit to collect a signal from an inductor, reduces complexity of a switching mode power supply, decreases a current collection time, and improves an operating frequency.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely some but not all of the embodiments of the present invention. All other embodiments obtained by a person of ordinary skill in the art based on the embodiments of the present invention without creative efforts shall fall within the protection scope of the present invention.

Figure 1:
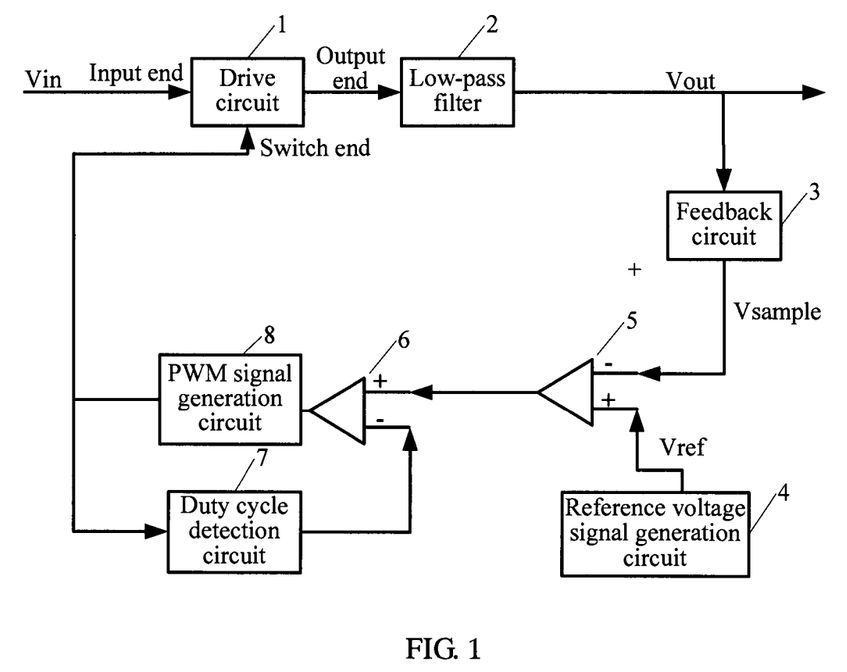
FIG. 1 is a schematic structural diagram of a switching mode power supply according to a first embodiment of the present invention.

FIG. 1 is a schematic structural diagram of a switching mode power supply according to a first embodiment of the present invention. In this embodiment, the switching mode power supply includes a drive circuit 1, a low-pass filter 2, a feedback circuit 3, a reference voltage signal generation circuit 4, an operational amplifier 5, a comparator 6, a duty cycle detection circuit 7, and a PWM signal generation circuit 8, where the drive circuit 1 is configured to convert a DC input voltage signal from an input end of the switching mode power supply into a pulse output voltage signal according to a PWM signal that is input by a switch end; the low-pass filter 2 is configured to perform filtering on the pulse output voltage signal that is output by the drive circuit 1 to obtain a DC output voltage signal, where the DC voltage signal is output at an output end of the switching mode power supply; the feedback circuit 3 is configured to perform sampling on the DC output voltage signal that is output by the low-pass filter 2 to obtain a sampled voltage signal, and input the sampled voltage signal to a negative input end of the operational amplifier 5; the reference voltage signal generation circuit 4 is configured to generate a reference voltage signal, and output the reference voltage signal to a positive input end of the operational amplifier 5; an output end of the operational amplifier 5 is connected to a positive input end of the comparator 6, and the operational amplifier 5 is configured to amplify an error between the reference voltage signal and the sampled voltage signal and output an amplification result; the comparator 6 is configured to compare the amplification result with a triangular wave signal to obtain a level signal; the PWM signal generation circuit 8 is configured to generate a PWM signal according to the level signal that is output by the comparator 6, and input the PWM signal to the switch end of the drive circuit 1; and the duty cycle detection circuit 7 is configured to convert the PWM signal or the pulse output voltage signal (an example in which the duty cycle detection circuit 7 receives the PWM signal is used in FIG. 1, and an example in which the duty cycle detection circuit 7 receives the pulse output voltage signal is used in FIG. 2) into a triangular wave signal, and input the triangular wave signal to a negative input end of the comparator 6.

FIG. 1 is a structural diagram of the switching mode power supply according to this embodiment of the present invention. Connection relationships between components of the switching mode power supply are as follows: The low-pass filter 2 is connected between an output end of the drive circuit 1 and an input end of the feedback circuit 3; the feedback circuit 3 is connected to an output end of the low-pass filter 2, and is connected to the negative input end of the operational amplifier 5; an output end of the reference voltage signal generation circuit 4 is connected to the positive input end of the operational amplifier 5, and the output end of the operational amplifier 5 is connected to the positive input end of the comparator 6; the PWM signal generation circuit 8 is connected between an output end of the comparator 6 and the switch end of the drive circuit 1; and the duty cycle detection circuit 7 is connected between an output end of the PWM signal generation circuit 8 and the negative input end of the comparator 6. The comparator 6 is configured to compare an output result of the operational amplifier 5 with the triangular wave signal to obtain a comparison result, and send the comparison result to the PWM signal generation circuit 8.

Figure 2:
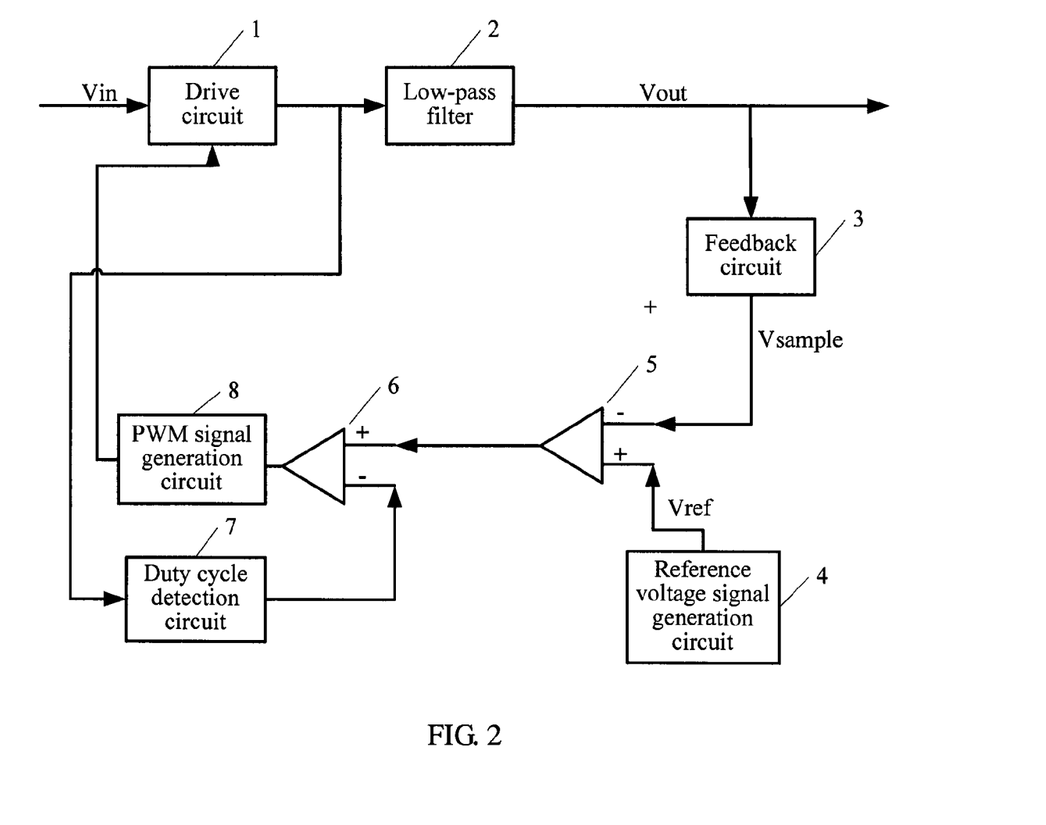
FIG. 2 is a schematic structural diagram of a switching mode power supply according to a second embodiment of the present invention.

FIG. 2 is a schematic structural diagram of another switching mode power supply according to an embodiment of the present invention. A difference between this switching mode power supply and the switching mode power supply in FIG. 1 lies only in that a connection relationship of a duty cycle detection circuit 7 is different, and the duty cycle detection circuit 7 in FIG. 2 is connected between an output end of a drive circuit 1 and a negative input end of a comparator 6.

In a solution of FIG. 1 or FIG. 2, the drive circuit 1 is implemented by a switching transistor (for example, a triode, a field effect transistor, or a thyristor), and an input end, an output end, and a switch end are disposed on the drive circuit 1. The drive circuit 1 is configured to enable/disable, according to a PWM signal that is input by the switch end, a DC input voltage signal Vin that is input from the input end, and output a pulse output voltage signal obtained after PWM, where the obtained pulse output voltage signal is a periodic square wave signal in this case. A low-pass filter circuit 2 performs filtering and freewheeling on the pulse output voltage signal that is output by the drive circuit 1 to obtain a stable DC output voltage signal Vout, and a value of the Vout is determined by a duty cycle of the PWM signal that is input by the switch end of the drive circuit 1; one output branch of the DC output voltage signal Vout supplies power to a load, and the other output branch is sent to a control loop (where the control loop includes a feedback circuit 3, a reference voltage signal generation circuit 4, an operational amplifier 5, a comparator 6, and a PWM signal generation circuit 8). The feedback circuit 3 is configured to perform sampling on the DC output voltage signal Vout to obtain a sampled voltage signal Vsample; a coupling manner between the feedback circuit 3 and a main circuit may be direct coupling, indirect coupling, or photoelectric coupling, which is not limited in the present invention. The main circuit includes the drive circuit 1 and the low-pass filter circuit 2.

The operational amplifier 5 performs error amplification on the sampled voltage signal Vsample that is output by the feedback circuit 3 and a reference voltage signal Vref that is output by the reference voltage signal generation circuit, and a voltage signal obtained at an output end of the operational amplifier 5 is A*(Vref−Vsample), where A is a gain of the operational amplifier 5. It may be understood that, similar to the prior art, a resistor may be connected between a positive input end and the output end, and between a negative input end and the output end of the operational amplifier to form a feedback loop, so as to form a positive feedback amplifying circuit or a negative feedback amplifying circuit, which can improve stability of a switching mode power supply gain.

The comparator 6 compares an amplitude of a voltage signal that is input at a positive input end and an amplitude of a voltage signal that is input at a negative input end. If the voltage signal of the positive input end is greater than the voltage signal of the negative input end, an output end of the comparator 6 outputs a high level; otherwise, a low level is output. In FIG. 1, the voltage signal of the positive input end of the comparator 6 is A*(Vref−Vsample), and the voltage signal of the negative input end of the comparator 6 is a voltage signal that is output by the duty cycle detection circuit 7; the duty cycle detection circuit 7 collects an AC output signal for which PWM signal modulation has been performed from the main circuit or a PWM signal that is directly output by the PWM generation circuit 8 in the control loop, where the PWM signal and the pulse output voltage signal both are square wave signals; the duty cycle detection circuit 7 converts a square wave signal into a triangular wave signal, and inputs the triangular wave signal to the negative input end of the comparator 6. In this way, the voltage signal of the negative input end of the comparator is directly converted form a square wave signal in the main circuit or the control loop, which avoids using a complex collection circuit to collect a current from an inductor, reduces complexity of the switching mode power supply, decreases a collection time, and improves an operating frequency.

Figure 3:
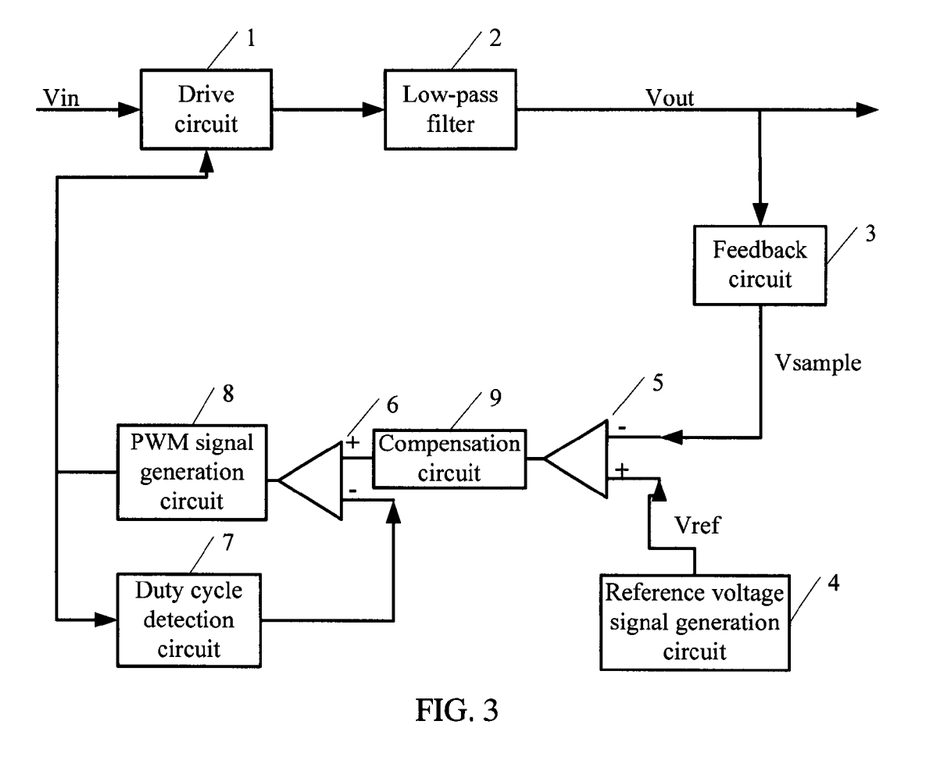
FIG. 3 is a schematic structural diagram of a switching mode power supply according to a third embodiment of the present invention.

Optionally, referring to FIG. 3, a switching mode power supply in an embodiment of the present invention further includes a compensation circuit 9. The compensation circuit 9 is disposed in a control loop of the switching mode power supply, and for example, is coupled to an output end of an operational amplifier 5, and is configured to adjust a gain margin and a phase margin of the switching mode power supply, so that the switching mode power supply remains stable. If a gain of a closed-loop control system shown in FIG. 1 or FIG. 2 is a unit gain 1, and when an internal phase shift that varies with frequency is 360° (degrees), the closed-loop control system may be unstable. The switching mode power supply in this embodiment is a closed-loop control system. To ensure better stability of the switching mode power supply, it is necessary to control a connection manner of the operational amplifier, and therefore a 180° phase shift is introduced. If a fed back phase remains within 180°, the control loop of the switching mode power supply is always stable. However, during practical operating of the switching mode power supply, an additional phase shift is introduced due to various switch delays and a reactance characteristic of an element; therefore, the switching mode power supply needs to use a proper compensation circuit to maintain the stability of the switching mode power supply. Indicators for measuring the stability of the switching mode power supply are a phase margin and a gain margin, where the phase margin refers to a corresponding phase when a gain of the closed-loop control system is decreased to 0 decibels (dB), and the gain margin refers to a corresponding gain value when a phase of the closed-loop control system is zero.

Figure 4:
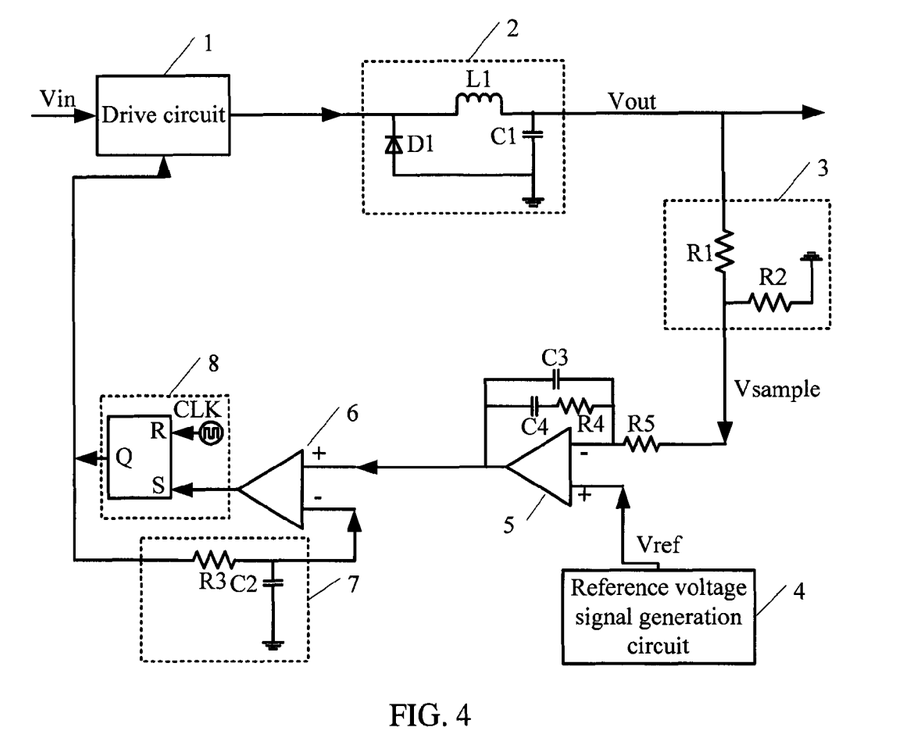
FIG. 4 is a schematic structural diagram of a switching mode power supply according to a fourth embodiment of the present invention.

FIG. 4 is a schematic structural diagram of a switching mode power supply according to an embodiment of the present invention. In this embodiment of the present invention, preferably, a low-pass filter 2 is a passive low-pass filter, and the low-pass filter includes an inductor L1, a first capacitor C1, and a diode D1. One end of the inductor is connected to an output end of a drive circuit 1 and a cathode of the diode D1, an anode of the diode D1 is connected through the first capacitor C1 to the other end of the inductor L1, the anode of the diode D1 is also grounded, and the other end of the inductor L1 is coupled to an output end of the switching mode power supply.

Preferably, a feedback circuit 3 is directly coupled to a main circuit. The feedback circuit 3 includes a first resistor R1 and a second resistor R2, where one end of the first resistor R1 is connected to the other end of the inductor L1, the other end of the first resistor R1 is grounded using the second resistor R2, and the other end of the first resistor R1 is connected to a negative input end of an operational amplifier 5. A sampled voltage that is output by the feedback circuit is Vout*R2/(R1+R2).

Preferably, a duty cycle detection circuit 7 is an integrator circuit. The duty cycle detection circuit 7 includes a third resistor R3 and a second capacitor C2, where one end of the third resistor R3 is connected to an output end of a PWM signal generation circuit 8 or the output end of the drive circuit, and the other end of the third resistor R3 is connected to a negative input end of a comparator 6; one end of the second capacitor C2 is connected to a negative input end of a comparator 6, and the other end of the second capacitor C2 is grounded. FIG. 4 shows a scenario in which the duty cycle detection circuit 7 collects a PWM signal of a control loop as an input signal. In a scenario in which the duty cycle detection circuit 7 collects a pulse output voltage signal of the main circuit, one end of the third resistor R3 in the duty cycle detection circuit 7 is connected to the output end of the drive circuit 1, and a connection relationship of other elements is not changed.

Preferably, a compensation circuit includes a third capacitor C3, a fourth capacitor C4, a fourth resistor R4, and a fifth resistor R5, where the fifth resistor R5 is located between an output end of the feedback circuit 3 and the negative input end of the operational amplifier 5; the fourth resistor R4 and the fourth capacitor C4 connected in series to the fourth resistor R4 are cross-connected between the negative input end of the operational amplifier 5 and an output end of the operational amplifier 5, and the third capacitor C3 is cross-connected between the negative input end of the operational amplifier 5 and the output end of the operational amplifier 5.

Preferably, a PWM signal generation circuit 8 includes an RS flip-flop and a clock generation circuit CLK, where the clock generation circuit CLK is configured to generate a periodic clock signal, and output the clock signal to a reset end of the RS flip-flop; the reset end of the RS flip-flop is connected to an output end of the clock generation circuit CLK, a set end of the RS flip-flop is connected to an output end of the comparator 6, and an output end of the RS flip-flop is connected to a switch end of the drive circuit 1.

Preferably, the switching mode power supply is formed on a substrate using a manufacturing process of an integrated circuit.

Figure 5:
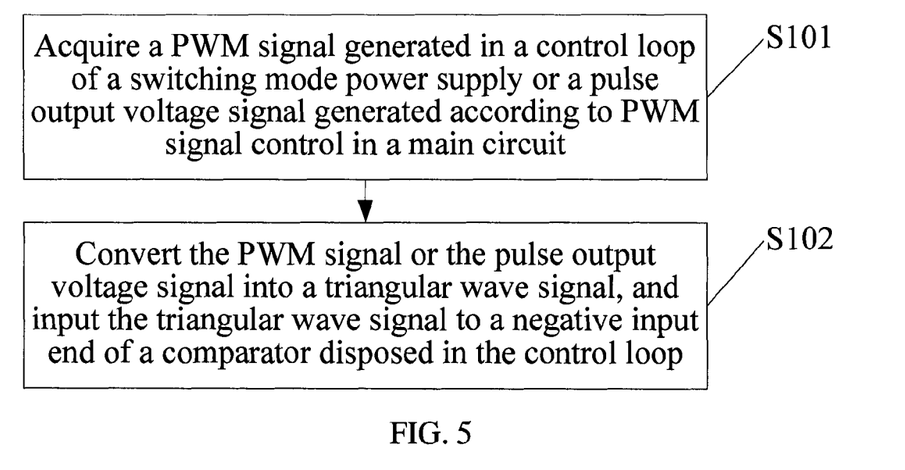
FIG. 5 is a schematic flowchart of a loop control method of a switching mode power supply according to an embodiment of the present invention.

FIG. 5 is a loop control method of a switching mode power supply according to a first embodiment of the present invention. In this embodiment of the present invention, the method includes the following steps:

S101. Acquire a PWM signal generated in a control loop of the switching mode power supply or a pulse output voltage signal generated according to PWM signal control in a main circuit.

S102. Convert the PWM signal or the pulse output signal into a triangular wave signal, and input the triangular wave signal to a negative input end of a comparator disposed in the control loop.

The main circuit of the switching mode power supply includes a drive circuit 1 and a low-pass filter 2, and the control loop of the switching mode power supply includes a feedback circuit 3, a reference voltage signal generation circuit 4, an operational amplifier 5, a comparator 6, and a PWM signal generation circuit 8, where the drive circuit 1 is configured to convert a DC input voltage signal of an input end into a pulse output voltage signal according to a PWM signal that is input by a switch end; the low-pass filter 2 is configured to perform filtering on the pulse output voltage signal that is output by the drive circuit 1 to obtain a DC output voltage signal, where the DC output voltage signal is output at an output end of the switching mode power supply; the feedback circuit 3 is configured to perform sampling on the DC output voltage signal to obtain a sampled voltage signal, and input the sampled voltage signal to a negative input end of the operational amplifier 5; the reference voltage signal generation circuit 4 is configured to generate a reference voltage signal, and input the reference voltage signal to a positive input end of the operational amplifier 5; an output end of the operational amplifier 5 is connected to a positive input end of the comparator 6; the PWM signal generation circuit 8 is configured to generate the PWM signal according to a level signal that is output by the comparator 6, and input the PWM signal to the switch end of the drive circuit 1; and a duty cycle detection circuit 7 converts the PWM signal or the pulse output voltage signal into a triangular wave signal, and input the triangular wave signal to a negative input end of the comparator 6. This avoids using a complex collection circuit to collect a signal from an inductor, reduces complexity of the switching mode power supply, decreases a collection time, and improves an operating frequency. For connection relationships of various circuits or elements in the switching mode power supply involved in the method, reference may be made to the foregoing embodiments corresponding to FIG. 1 to FIG. 4, and details are not described herein again.

It should be noted that the accompanying drawings in the embodiments are merely schematic diagrams, and description such as "connect" or "couple" involved in the embodiments not only include a direct connection using a wire, but also include a connection using one or more third-party components; that is, there may be multiple specific connection or coupling manners, which are not shown in the drawings; however, a person skilled in the art should understand that it shall not be limited to a direct connection using a wire.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:
1. A switching mode power supply comprising:
a drive circuit;
a low-pass filter;
a feedback circuit;
an operational amplifier;
a reference voltage signal generation circuit;
a comparator;
a pulse width modulation (PWM) signal generation circuit; and
a duty cycle detection circuit,
wherein the drive circuit is configured to convert a direct current (DC) input voltage signal from an input end of the switching mode power supply into a pulse output voltage signal according to a PWM signal that is input by a switch end,
wherein the low-pass filter is configured to perform filtering on the pulse output voltage signal that is output by the drive circuit to obtain a direct current (DC) output voltage signal,
wherein the DC output voltage signal is output at an output end of the switching mode power supply,
wherein the feedback circuit is configured to perform sampling on the DC output voltage signal to obtain a sampled voltage signal, and input the sampled voltage signal to a negative input end of the operational amplifier,
wherein the reference voltage signal generation circuit is configured to generate a reference voltage signal, and input the reference voltage signal to a positive input end of the operational amplifier, wherein an output end of the operational amplifier is connected to a positive input end of the comparator, wherein the operational amplifier is configured to amplify an error between the reference voltage signal and the sampled voltage signal and output an amplification result, wherein the duty cycle detection circuit is configured to convert the PWM signal or the pulse output voltage signal into a triangular wave signal, and input the triangular wave signal to a negative input end of the comparator, wherein the comparator is configured to compare the amplification result with the triangular wave signal to obtain a level signal, wherein the PWM signal generation circuit is configured to generate the PWM signal according to the level signal that is output by the comparator, and input the PWM signal to the switch end of the drive circuit wherein the duty cycle detection circuit is an integrator circuit, wherein the duty cycle detection circuit comprises a third resistor and a second capacitor, wherein one end of the third resistor is connected to an output end of the PWM signal generation circuit or the output end of the drive circuit, wherein the other end of the third resistor is connected to the negative input end of the comparator, wherein one end of the second capacitor is connected to the negative input end of the comparator, and wherein the other end of the second capacitor is grounded.

2. The switching mode power supply according to claim 1, wherein the low-pass filter is a passive low-pass filter.

3. The switching mode power supply according to claim 1, wherein the low-pass filter comprises an inductor, a diode, and a first capacitor, wherein one end of the inductor is connected to an output end of the drive circuit and a cathode of the diode, wherein an anode of the diode is connected through the first capacitor to the other end of the inductor, wherein the anode of the diode is also grounded, and wherein the other end of the inductor is coupled to the output end of the switching mode power supply.

4. The switching mode power supply according to claim 1, wherein the feedback circuit comprises a first resistor and a second resistor, wherein one end of the first resistor is connected to the other end of an inductor, wherein the other end of the first resistor is grounded by using the second resistor, and wherein the other end of the first resistor is connected to the negative input end of the operational amplifier.

5. The switching mode power supply according to claim 1, further comprising a compensation circuit, wherein the compensation circuit is coupled to the operational amplifier, and is configured to adjust a gain margin and a phase margin of the switching mode power supply so that the switching mode power supply remains stable.

6. The switching mode power supply according to claim 1, wherein the switching mode power supply is formed on a substrate by using a manufacturing process of an integrated circuit.

7. A switching mode power supply comprising:
a drive circuit;
a low-pass filter;
a feedback circuit;
an operational amplifier;
a reference voltage signal generation circuit;
a comparator;
a pulse width modulation (PWM) signal generation circuit;
a duty cycle detection circuit; and
a compensation circuit, wherein the drive circuit is configured to convert a direct current (DC) input voltage signal from an input end of the switching mode power supply into a pulse output voltage signal according to a PWM signal that is input by a switch end, wherein the low-pass filter is configured to perform filtering on the pulse output voltage signal that is output by the drive circuit to obtain a direct current (DC) output voltage signal, wherein the DC output voltage signal is output at an output end of the switching mode power supply, wherein the feedback circuit is configured to perform sampling on the DC output voltage signal to obtain a sampled voltage signal, and input the sampled voltage signal to a negative input end of the operational amplifier, wherein the reference voltage signal generation circuit is configured to generate a reference voltage signal, and input the reference voltage signal to a positive input end of the operational amplifier, wherein an output end of the operational amplifier is connected to a positive input end of the comparator, wherein the operational amplifier is configured to amplify an error between the reference voltage signal and the sampled voltage signal and output an amplification result, wherein the duty cycle detection circuit is configured to convert the PWM signal or the pulse output voltage signal into a triangular wave signal, and input the triangular wave signal to a negative input end of the comparator, wherein the comparator is configured to compare the amplification result with the triangular wave signal to obtain a level signal, wherein the PWM signal generation circuit is configured to generate the PWM signal according to the level signal that is output by the comparator, and input the PWM signal to the switch end of the drive circuit, wherein the compensation circuit is coupled to the operational amplifier and configured to adjust a gain margin and a phase margin of the switching mode power supply so that the switching mode power supply remains stable, wherein the compensation circuit comprises a third capacitor, a fourth capacitor, a fourth resistor, and a fifth resistor, wherein the fifth resistor is located between an output end of the feedback circuit and the negative input end of the operational amplifier, wherein the fourth resistor and the fourth capacitor connected in series to the fourth resistor are cross-connected between the negative input end of the operational amplifier and the output end of the operational amplifier, and wherein the third capacitor is cross-connected between the negative input end of the operational amplifier and the output end of the operational amplifier.

8. A switching mode power supply comprising:
a drive circuit;
a low-pass filter;
a feedback circuit;
an operational amplifier;

a reference voltage signal generation circuit;
a comparator;
a pulse width modulation (PWM) signal generation circuit; and
a duty cycle detection circuit,
wherein the drive circuit is configured to convert a direct current (DC) input voltage signal from an input end of the switching mode power supply into a pulse output voltage signal according to a PWM signal that is input by a switch end,
wherein the low-pass filter is configured to perform filtering on the pulse output voltage signal that is output by the drive circuit to obtain a direct current (DC) output voltage signal,
wherein the DC output voltage signal is output at an output end of the switching mode power supply,
wherein the feedback circuit is configured to perform sampling on the DC output voltage signal to obtain a sampled voltage signal, and input the sampled voltage signal to a negative input end of the operational amplifier,
wherein the reference voltage signal generation circuit is configured to generate a reference voltage signal, and input the reference voltage signal to a positive input end of the operational amplifier,
wherein an output end of the operational amplifier is connected to a positive input end of the comparator,
wherein the operational amplifier is configured to amplify an error between the reference voltage signal and the sampled voltage signal and output an amplification result,
wherein the duty cycle detection circuit is configured to convert the PWM signal or the pulse output voltage signal into a triangular wave signal, and input the triangular wave signal to a negative input end of the comparator,
wherein the comparator is configured to compare the amplification result with the triangular wave signal to obtain a level signal,
wherein the PWM signal generation circuit is configured to generate the PWM signal according to the level signal that is output by the comparator, and input the PWM signal to the switch end of the drive circuit
wherein the duty cycle detection circuit is an integrator circuit,
wherein the duty cycle detection circuit comprises a third resistor and a second capacitor,
wherein one end of the third resistor is connected to an output end of the PWM signal generation circuit or the output end of the drive circuit,
wherein the other end of the third resistor is connected to the negative input end of the comparator,
wherein one end of the second capacitor is connected to the negative input end of the comparator,
wherein the other end of the second capacitor is grounded
wherein the PWM signal generation circuit comprises a reset-set (RS) flip-flop and a clock generation circuit,
wherein a reset end of the RS flip-flop is connected to an output end of the clock generation circuit,
wherein a set end of the RS flip-flop is connected to an output end of the comparator, and
wherein an output end of the RS flip-flop is connected to the switch end of the drive circuit.

* * * * *